US012129974B2

(12) United States Patent
Young

(10) Patent No.: US 12,129,974 B2
(45) Date of Patent: Oct. 29, 2024

(54) SYSTEM AND METHOD FOR LEAK CONTAINMENT, LEAK DETECTION, AND CORROSION MITIGATION IN A PIPELINE ENVIRONMENT

(71) Applicant: Total Containment Inc., Devon (CA)

(72) Inventor: Lawrence William Young, Edmonton (CA)

(73) Assignee: Total Containment Inc., Edmonton (CA)

( * ) Notice: Subject to any disclaimer, the term of this patent is extended or adjusted under 35 U.S.C. 154(b) by 0 days.

(21) Appl. No.: 17/371,167

(22) Filed: Jul. 9, 2021

(65) Prior Publication Data

US 2021/0381656 A1 Dec. 9, 2021

Related U.S. Application Data

(63) Continuation-in-part of application No. 17/221,853, filed on Apr. 5, 2021, now abandoned, which is a continuation of application No. 16/322,804, filed as application No. PCT/CA2017/050934 on Aug. 4, 2017, now Pat. No. 10,969,061.

(60) Provisional application No. 62/372,262, filed on Aug. 8, 2016.

(51) Int. Cl.
*F17D 5/02* (2006.01)

(52) U.S. Cl.
CPC .................................... *F17D 5/02* (2013.01)

(58) Field of Classification Search
CPC .................................... F17D 5/00; F17D 5/02
See application file for complete search history.

(56) References Cited

U.S. PATENT DOCUMENTS 2,007,969 A * 7/1935 Grodsky ................. E02B 13/00 138/DIG. 6
3,675,432 A * 7/1972 Keene ..................... F16L 59/12 405/157
5,172,730 A * 12/1992 Driver ..................... G01M 3/18 138/104
6,305,427 B1 * 10/2001 Priest, II ................. F16L 11/12 138/104
10,969,061 B2 * 4/2021 Young ........................ F17D 5/02
2009/0050225 A1 * 2/2009 Thomas .................. F16L 11/12 138/104

FOREIGN PATENT DOCUMENTS

EP 2042793 A1 * 4/2009 .............. F16L 1/028

* cited by examiner

*Primary Examiner* — Janine M Kreck
(74) *Attorney, Agent, or Firm* — Marin Patents LLC; Gustavo Marin

(57) ABSTRACT

Systems for containing a fluid leaked from a pipeline include a flexible, impermeable liner such as like those comprising a coated substrate (or other impermeable liner or material) and disposed to extend along a trench for enveloping the pipeline deployed therein; and separating means disposed between the pipeline and the containment liner for containing the fluid therein; wherein the liner prevents migration of the fluid into the trench of the pipeline or surrounding environment by flowing the fluid laterally within the containment liner, system also protects the steel pipe from corrosion caused by the environment, such as groundwater. Methods for deploying the above systems are provided.

16 Claims, 16 Drawing Sheets

SYSTEM AND METHOD FOR LEAK CONTAINMENT, LEAK DETECTION, AND CORROSION MITIGATION IN A PIPELINE ENVIRONMENT

CROSS-REFERENCE TO RELATED APPLICATIONS

This application is a continuation-in-part of U.S. patent application Ser. No. 17/221,853 filed on Apr. 5, 2021, which is a continuation of U.S. patent application Ser. No. 16/322,804 filed on Feb. 1, 2019, which is a National Stage Entry of PCT application PCT/CA2017/050934 filed on Aug. 4, 2017, which claims the benefit of U.S. Provisional Patent Application Ser. No. 62/372,262, filed Aug. 8, 2016, the entirety of which is incorporated herein by reference.

FIELD OF THE DISCLOSURE

The present invention is directed to the field of environmental protection, and more particularly to the field of pipeline leak mitigation, environment contamination prevention, spill reclamation, and prevention of corrosion in pipelines.

BACKGROUND

Leakage or spillage of petroleum products, chemicals, hazardous substances, and wastes poses a significant threat to workers, the workplace, and the environment. Consequently, efforts have been made by petroleum industry workers, chemical industry workers, transportation industry workers, military personnel, and other workers involved in liquid containment to guard against environmental contamination resulting from undesired release into the environment of various liquids and chemicals. In particular, pipeline companies often cooperate with local emergency responders along pipeline right-of-way and work with and often train with fire departments or hazardous materials units for the mitigation of spills and other faults with energy transmission via pipelines.

Pipelines may be positioned underground, carrying highly pressurized gas and oil for decades. However, pipelines may break for many reasons including, for example, slow deterioration or corrosion, equipment or weld failures, construction workers hitting pipes with their excavation equipment, and unforeseen natural disasters. Hundreds of pipeline accidents (i.e., leaks, ruptures) occur annually, with the consequences being potentially catastrophic to humans, animals, and the environment. Following a spill, it is tremendously expensive to clean and remediate the environment. Negative media attention can sour public opinion, making it exceedingly difficult for pipeline builders and operators to expand their businesses. Antiquated pipes, minimal oversight, and inadequate precautions put the public and the environment at increasing risk.

Various approaches to solving this problem have involved using tougher, puncture-proof steel for the pipeline; designing protective jackets around the pipeline; applying epoxy coatings to the pipeline; modifying the wall thickness of the pipeline; and using inspection, surveillance, and monitoring equipment in order to inspect the wall thickness, welds, and integrity of the pipeline; expedite response to a spill; and minimize the danger and damage once a spill has occurred. However, inspection, surveillance, and monitoring does not effectively prevent the leaking fluid from being released into the environment.

Safety and health regulations require secondary containment to be utilized for storage containers (e.g., drums, tanks, totes) which hold petroleum products, chemicals, hazardous substances, and wastes. Secondary containment protects not only the environment from contamination but also employees working in areas where such materials are stored and used. However, secondary containment is lacking for pipelines.

Accordingly, there remains a need in the art for ways to contain spills from pipelines to mitigate these problems.

SUMMARY OF THE INVENTION

The present invention relates to systems and methods for secondary containment for a fluid conveyed by pipeline transport.

In one aspect, the invention comprises a system for containing a fluid leaked from a pipeline comprising:

- a flexible, impermeable liner comprising a coated substrate and disposed to extend along a trench for enveloping the pipeline deployed therein; and
- separating means disposed between the pipeline and the liner for containing the fluid therein;
- wherein the liner prevents migration of the fluid into the trench by flowing the fluid laterally within the liner.

In one embodiment, the substrate is selected from woven geotextile fabric, para-aramid synthetic fiber, carbon fiber, fiberglass, rubber, thermoplastic, epoxy, or polymer. In one embodiment, the substrate is coated with a polymer selected from polyurethane, polyurea, or a combination thereof. In one embodiment, the liner further comprises an insulation layer formed on the coated substrate. In one embodiment, the liner comprises a base having sufficient width and length to accommodate the pipeline, a plurality of upstanding sides, segments extending from the sides, and first and second ends to form a seal around the pipeline.

In one embodiment, the separating means is selected from soil, an aggregate material, or an engineered material.

In one embodiment, the system further comprises a vent extending upwardly from within the liner to above ground surface, the vent being anchored and sealed within the liner by a flanged boot.

In one embodiment, the system further comprises one or more reservoirs spaced apart along the length of the trench for receiving the fluid flowing along the trench or the containment channel. In one embodiment, the system further comprises an overflow drain for allowing excess fluid to flow from one reservoir into a downstream reservoir.

In one embodiment, the trench is in the form of an underground enclosed tunnel-like trench.

In another aspect, the invention comprises a method for deploying a system for containing a fluid leaked from a pipeline comprising the steps of:

- disposing a flexible, impermeable liner comprising a coated substrate to extend along a trench; and
- deploying the pipeline within the liner with separating means being disposed between the pipeline and the liner for containing the fluid therein; wherein the liner prevents migration of the fluid into the trench by flowing the fluid laterally within the liner.

In one embodiment, the liner is prefabricated or formed on-site by placing a flexible substrate within the trench and coating the substrate with a polymer until cured. In one embodiment, the liner is prefabricated or formed on-site to comprise a base having sufficient width and length to accommodate the pipeline, a plurality of upstanding sides, segments extending from the sides, and first and second ends. In one embodiment, the liner is prefabricated or formed on-site to define a containment channel extending along the length of the trench.

In one embodiment, the segments are overlapped and spray-welded for enveloping and sealing the pipeline within the liner.

In one embodiment, the separating means is selected from soil, an aggregate material, or an engineered material disposed on one or more of the top, bottom, and sides of the pipeline.

In one embodiment, the method further comprises the step of installing a vent to extend upwardly from within the liner to above ground surface, the vent being anchored and sealed within the liner by a flanged boot.

In one embodiment, the method further comprises installing one or more reservoirs spaced apart along the length of the trench for receiving the fluid flowing along an inside portion of the containment system, using an auxiliary line that is connected to the inside portion of the containment system to the reservoir via a pipe suitable to allow flow of leaked liquid from the containment system to the reservoir.

In one embodiment, the trench is in the form of an underground enclosed tunnel-like trench. In one embodiment, the containment system and the pipeline are disposed within the tunnel-like trench by a pulling means, e.g., in the case of a crossing such as under a river or a road. In one embodiment, the method further comprises pumping an absorbent or diffusing material into one or more voids between the tubular liner and the pipeline.

Additional aspects and advantages of the present invention will be apparent in view of the description, which follows. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be described by way of an exemplary embodiment with reference to the accompanying simplified, diagrammatic, not-to-scale drawings. In the drawings.

DETAILED DESCRIPTION

Figure 1A:
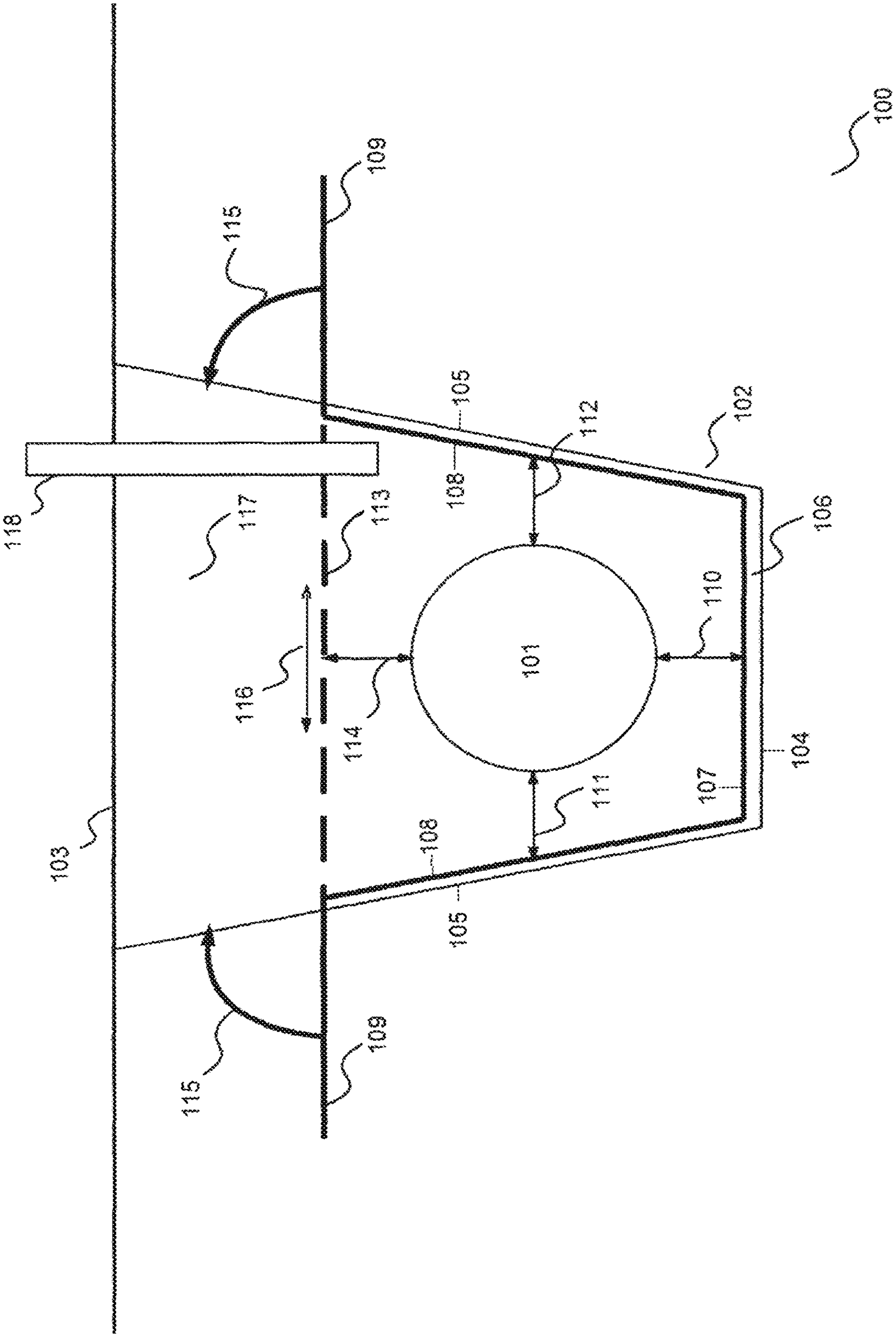
FIG. 1A is a cross-sectional view of one embodiment of a system for a lined pipeline trench.

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a," "an," and "the" include plural referents unless the context clearly dictates otherwise.

The present invention relates to systems and methods for secondary containment for a fluid conveyed by pipeline transport.

As used herein, the term "secondary containment" refers to a control measure placed around or otherwise surrounding a pipeline to prevent a fluid contained therein from spillage and subsequent pollution of the environment in the vicinity of the pipeline. As used herein, the term "contain" refers to constraining a fluid within limits. As used herein, the term "environment" is considered to include soil, groundwater, surface water, natural earthen materials, air, and the like. The fluid may be flammable, hazardous, and/or corrosive.

As used herein, the term "pipeline" refers to a pipe used to convey a fluid or combination of fluids, gas, or product, including installations associated with the pipe.

As used herein, the term "fluid" refers to any liquid or liquid-like substance including, but not limited to, crude oil (petroleum), refined oil products (petroleum products derived from crude oil such as fuel oil, kerosene, gasoline, and diesel oil), natural gas products, sludge, sewage, oil refuse, oil mixed with wastes, oils or greases of animal, fish or marine origin, vegetable oils, synthetic oils, mineral oils, chemicals, salt water, wastewater, and the like.

As used herein, the term "trench" refers to any elongate excavation or depression formed in the ground. The term is meant to include a trench which is either "open" (e.g., in the form of an exposed ditch or trough dug into the surface of the ground), or "closed" (e.g., in the form of an enclosed underground tunnel or conduit).

As used herein, the term "engineered material" refers to any material capable of diffusing energy from a leak and being porous enough to allow the flow of air or liquid, a fluid either alone or in combination with soil, sand, aggregate material, and the like.

Figure 1C:
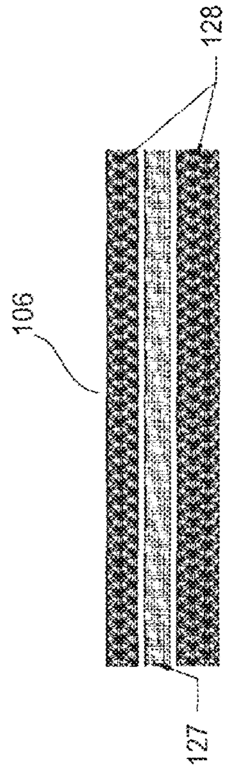
FIG. 1C is a cross-sectional view of one embodiment of a liner for lining a pipeline trench.
Figure 1B:
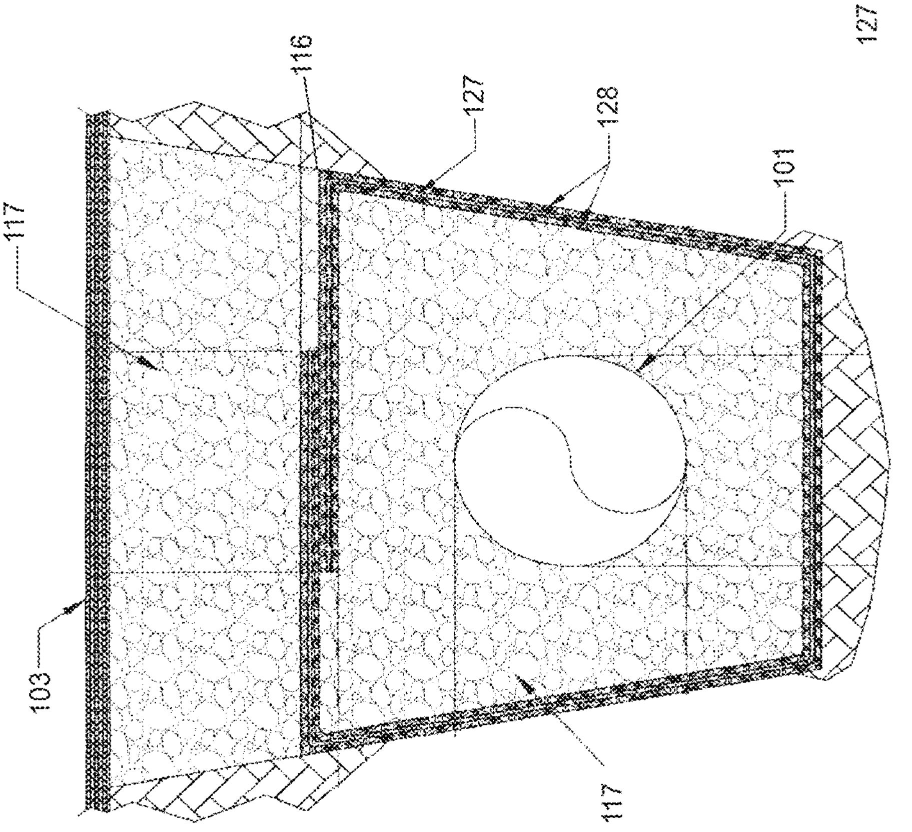
FIG. 1B is a cross-sectional view of the embodiment of a system for a lined pipeline trench.

The invention will now be described having reference to the accompanying Figures. Typically, pipelines can be built for use above or below the surface of the ground for temporary or permanent use. As shown in FIGS. 1A-1B, the present invention is used in the context of a pipeline (101) which is positioned within a conventional pipeline trench (102) below ground surface (103). In an embodiment, pipeline (101) may also be positioned above the ground level. For positioning pipeline (101) above the ground level, the engineered material may be used as backfill. Further, in some embodiments, the engineered material may be formed of a stable malleable material such that the engineered material may be unaffected by erosion. In such an arrangement, the containment system (100) to be installed within the trench (102) to avoid bulging of pipeline (101). However, advantageously, no support for containment system (100) may be required from the trench (102) walls.

The construction and configuration of a typical pipeline trench (102) are commonly known to those skilled in the art and will not be discussed in detail but are summarized briefly as follows since reference will be made to specific components of the trench (102) when describing the present invention herein. The trench (102) is excavated after the right-of-way for the pipeline (101) has been cleared of vegetation in the area. A working surface is then prepared by stripping and storing the topsoil layer and grading the subsoil to create a safe work surface. The topsoil removed from the right-of-way is conserved so that it can be replaced once pipeline construction has been completed. The trench (102) is dug along the right-of-way using specialized machinery such as backhoes. The trench (102) must have sufficient width and depth to accommodate the pipeline (101), meet regulatory requirements and best management practices, ensure safe operation of the pipeline (101), and minimize risk to public safety.

In one embodiment, the trench (102) comprises a bottom wall (104) having sufficient width and length to accommodate the pipeline (101), and a plurality of upstanding sidewalls (105) having sufficient height to provide the needed secondary containment capacity around the pipeline (101) and to extend upwardly to ground surface (103). When viewed in cross-section, the sidewalls (105) may form a substantially rectangular, square, or oblong-shaped containment around the pipeline (101). However, the particular size and shape of the trench (102) are not limitations of the invention.

In one embodiment shown in FIGS. 1A-1B, the system for secondary containment for pipeline transport (100) generally comprises a liner (106) disposed within the trench (102) and extending along the length of the trench (102), and the pipeline (101) deployed within the liner (106) and extending along the length of the liner (106).

The liner (106) is formed of materials which are chemically compatible with the expected contents of the pipeline (101) and other environmental conditions, are able to withstand environmental conditions (for example, high pressure) surrounding the pipeline (101) and below ground (for example, cold temperature), and are relatively strong to resist damage (for example, tears, rips).

In one embodiment, the liner (106) comprises a substantially flexible, impermeable material. As used herein, the term "flexible" refers to the ability to bend easily without breaking. As used herein, the term "impermeable" refers to the ability to prevent a fluid from passing therethrough. In one embodiment, the material comprises a flexible substrate (127) including, but not limited to, woven geotextile fabric, para-aramid synthetic fiber (e.g., Kevlar™), carbon fiber, fiberglass, rubbers, thermoplastics (for example, polyethylene, high density polyethylene, linear low-density polyethylene, polytetrafluoroethylene, or Teflon™), epoxies, other polymers, combinations thereof, and the like.

In one embodiment, the substrate (127) is coated on one or both sides to render or reinforce its impermeability. In one embodiment, the substrate (127) is coated with a polymer (128). In one embodiment, the polymer (128) is selected from polyurethane, polyurea, or a combination thereof. Polyurethane and polyurea confer resistance against chemical attacks. In one embodiment shown in FIG. 1C, the substrate (127) is coated on both sides to yield a "polymer-substrate-polymer." In one embodiment, the substrate (127) comprises fiberglass coated with polyurethane or polyurea which confers the ability to withstand relatively high pressures. In one embodiment, the substrate (127) comprises Kevlar™ or carbon fiber coated with polyurethane or polyurea which confers relatively high strength, high modulus, thermal stability, and toughness (i.e., affords protection against pipeline vandalism). The coating may be applied by spraying using an electric or hydraulic coatings proportioner, or other techniques well known to those skilled in the art.

In one embodiment, an insulation layer (not shown) is added on the negative side of the liner (106) to regulate the temperature of the fluid in order for example, to keep the fluid warm and moving with more fluidity. In one embodiment, the insulation layer is combined with a clear stone which can be washed (for example, with hot water) at the site of a leak. A substantial amount of the fluid (for example, 70% or more) can be recouped for recycling or reintroduction to the pipeline, or both.

The liner (106) is formed to conform to the configuration of the trench (102). The liner (106) can be prefabricated in a workshop to trench dimensions or prepared on-site. For on-site preparation, the liner (106) is formed by placing the flexible substrate (127) into the trench (102) to cover the bottom wall (104) and sidewalls (105) of the trench (102) and secured in place using suitable attachment means (e.g., pins, stakes) to "mold" the flexible substrate (127) to trench dimensions. The flexible substrate (127) is then coated on one or both sides with the selected polymer (128) for example, by spraying, to yield the liner (106). The coating is left to cure.

In one embodiment, the liner (106) comprises a base (107) having sufficient width and length to accommodate the pipeline (101), a plurality of upstanding sides (108), segments (109) extending from the sides (108) and ends (129). When viewed in cross-section, the base (107) and sides (108) may form a substantially rectangular, square, or oblong-shaped containment around the pipeline (101). However, the particular size and shape of the liner (106) are not limitations of the invention.

The liner (106) may be held against the bottom wall (104) and sidewalls (105) of the trench (102) by the force of the backfilled topsoil, aggregate material, or engineered material (117) which is refilled into the trench (102). The pipeline (101) is then placed into the lined trench (102). In one embodiment, the pipeline (101) is placed directly onto the base (107) of the liner (106) (i.e., a distance of 0 cm) so as to be seated substantially on the bottom wall (104) of the trench (102).

In one embodiment, the pipeline (101) is placed within the lined trench (102) with separation between the pipeline (101) and the liner (106). In one embodiment, the pipeline (101) is separated from the liner (106) on one or more of the top, bottom, and sides by backfilled topsoil, aggregate, or engineered material (117) refilled in such areas between the pipeline (101) and the liner (106). In one embodiment, the backfilled soil, aggregate, or engineered material (117) is substantially dry. Dry backfilled topsoil, aggregate, or engineered material (117) is used to retard any future corrosion to the pipeline (101). In one embodiment, the pipeline (101) is separated from the base (107) of the liner (106) at a base distance (110). In one embodiment, the base distance (110) is 0 cm. In one embodiment, the pipeline (101) is separated from the sides (108) of the liner (106) by side distances (111, 112). In one embodiment, each side distance (111, 112) is about 180 cm. In one embodiment, the pipeline (101) is separated from the cover (113) of the liner (106) by a top distance (114). In one embodiment, the top distance (114) is about 180 cm.

Figure 1E:
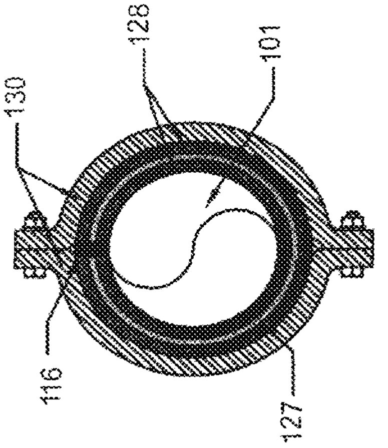
FIG. 1E is a cross-sectional view of the portion taken along line A-A of FIG. 1D.
Figure 1D:
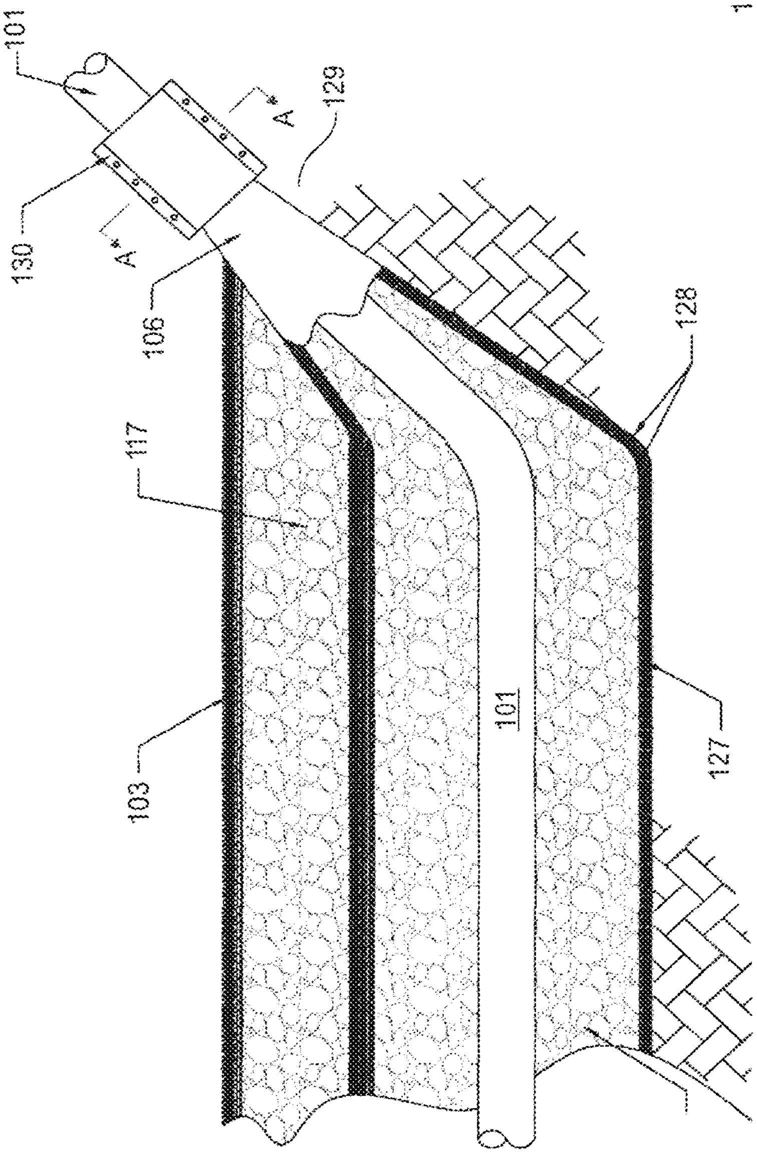
FIG. 1D is a cross-sectional view of one embodiment of an end portion of a system for a lined pipeline trench.

The segments (109) are overlapped using a n overlapping motion (indicated by arrows 115) to form the cover (113) and define an overlap section (116) to seal or envelop the pipeline (101) at the desired top distance (114). The ends (129) of the liner (106) are fastened shut using a clamp (130), thereby completing the "envelope" which seals around the pipeline (101) (FIGS. 1D-1E). As used herein, the term "envelope" means to cover or surround completely. In one embodiment, the overlap section (116) may be spray-welded with a polymer to seal around the pipeline (101). Suitable polymers include, but are not limited to, polyurethane, polyurea, or a combination thereof. In one embodiment, the overlap minimum ranges from about 5 cm to about 60 cm. In one embodiment, the overlap minimum is about 30 cm. In the area above the cover (113), backfilled topsoil (117) is refilled up to ground surface (103) to bury the secondary containment system (100).

Figure 2B:
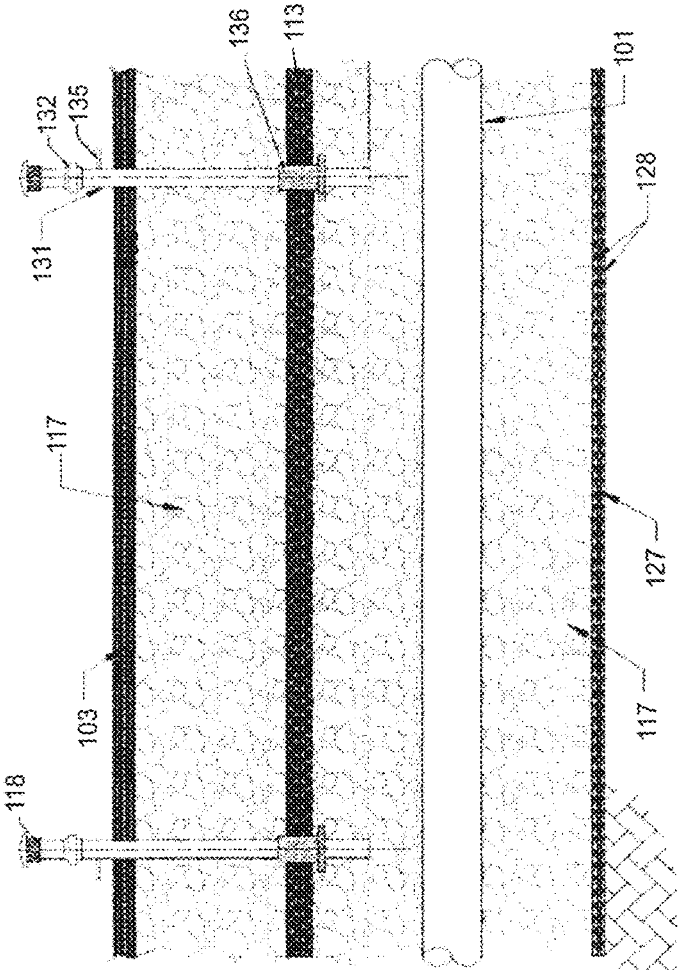
FIG. 2B is a cross-sectional view of one embodiment of a system for a lined pipeline trench.
Figure 2A:
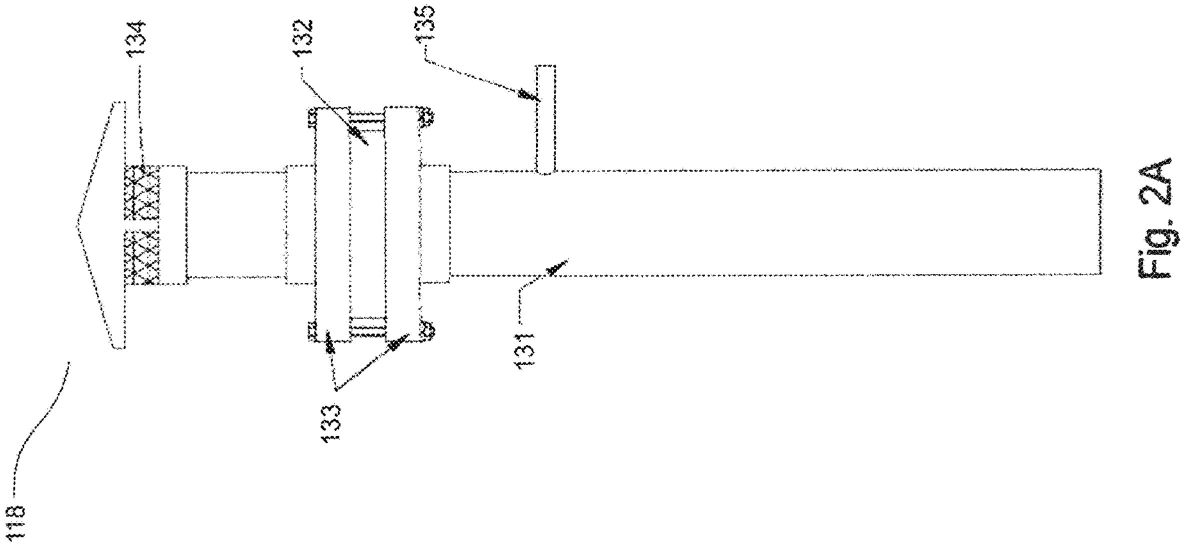
FIG. 2A is a side view of one embodiment of a vent for a system for a lined pipeline trench.
Figure 2C:
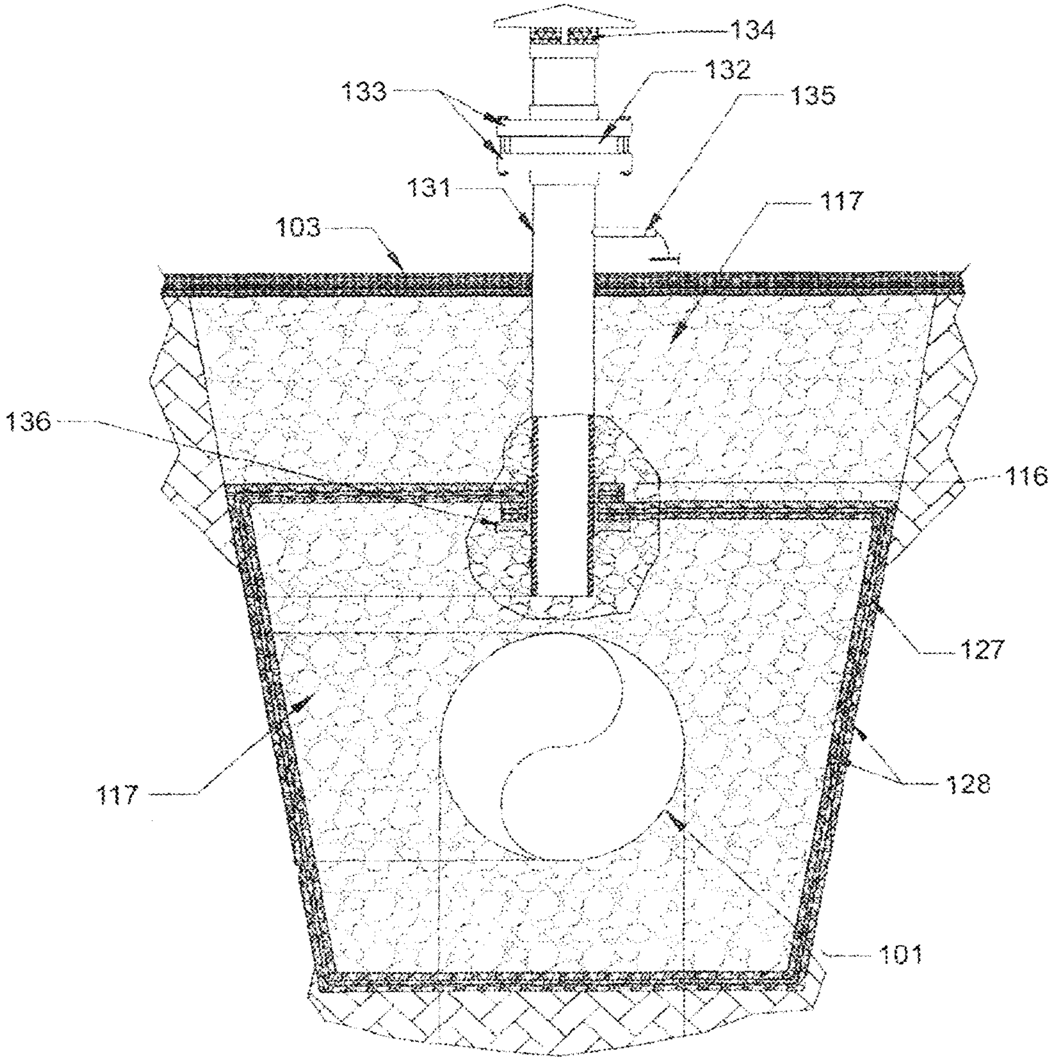
FIG. 2C is an enlarged cross-sectional view of a portion of the system shown in FIG. 2B.
Figure 2D:
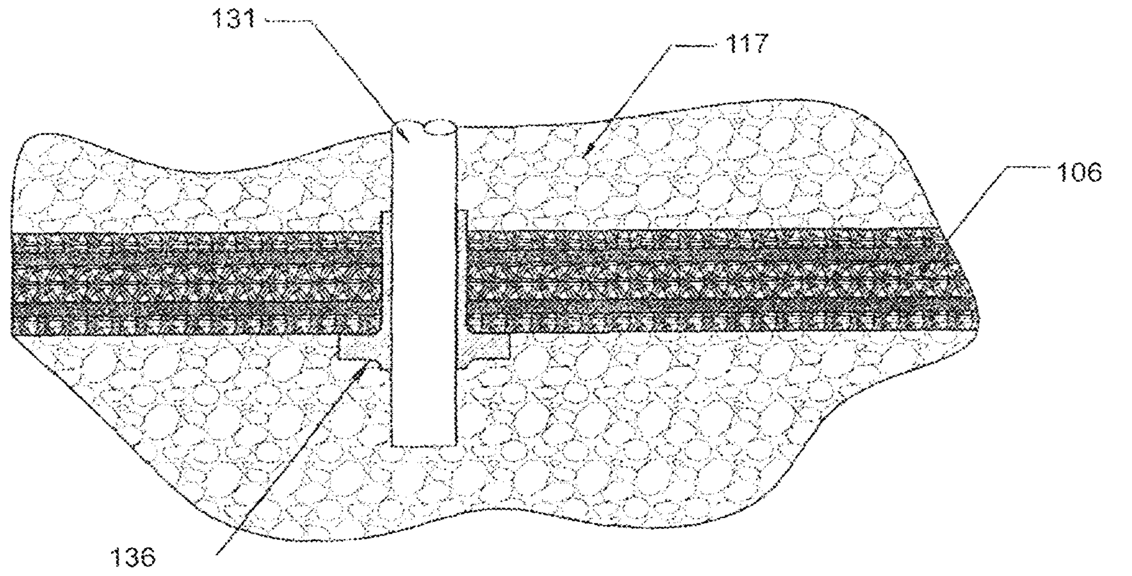
FIG. 2D is an enlarged cross-sectional view of a portion of the system shown in FIG. 2C.
Figure 2E:
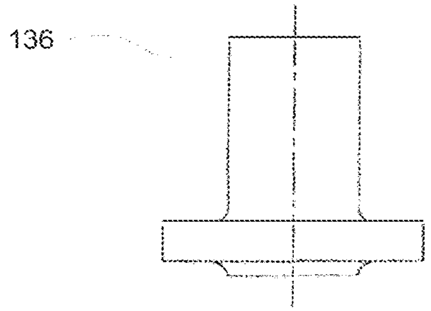
FIG. 2E is a side view of one embodiment of a boot for a vent.
Figure 2F:
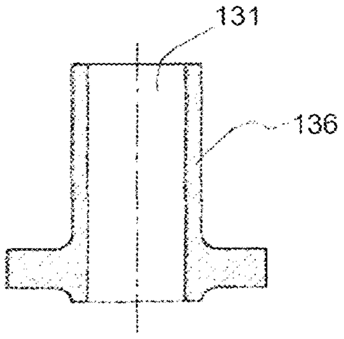
FIG. 2F is a cross-sectional view of the embodiment shown in FIG. 2E.

In one embodiment shown in FIGS. 2A-2C, a vent (118) is positioned above the pipeline (101) but within the liner (106) and extends through the cover (113) and upwardly above the ground surface (103). In one embodiment shown in FIGS. 2A and 2C, the vent (118) comprises a pipe (131), a wafer-style check valve (132) having flanges (133), a screen (134), and a sensor (135) for detecting any leaks. The vent (118) is anchored and sealed within the cover (113) by a flanged boot (136) which receives the pipe (131) therethrough and acts as a seal between the pipe (131) and the cover (113) (FIGS. 2D-2F). The vent (118) serves as an outlet for air, gas, or liquid in order to relieve pressure within the liner (106).

During breach of the pipeline (101), any fluid leaking from the pipeline (101) may be contained within the impermeable liner (106). The fluid is prevented from migrating behind the liner (106) and leaking onto the bottom wall (104) and sidewalls (105) of the trench (102), and into the natural environment. When the leak is significant enough to cause a build-up of fluid and pressure within the "envelope" defined by the liner (106), the fluid is forced to move laterally beneath and along the length of the pipeline (101) but remains contained within the liner (106).

Figure 3:
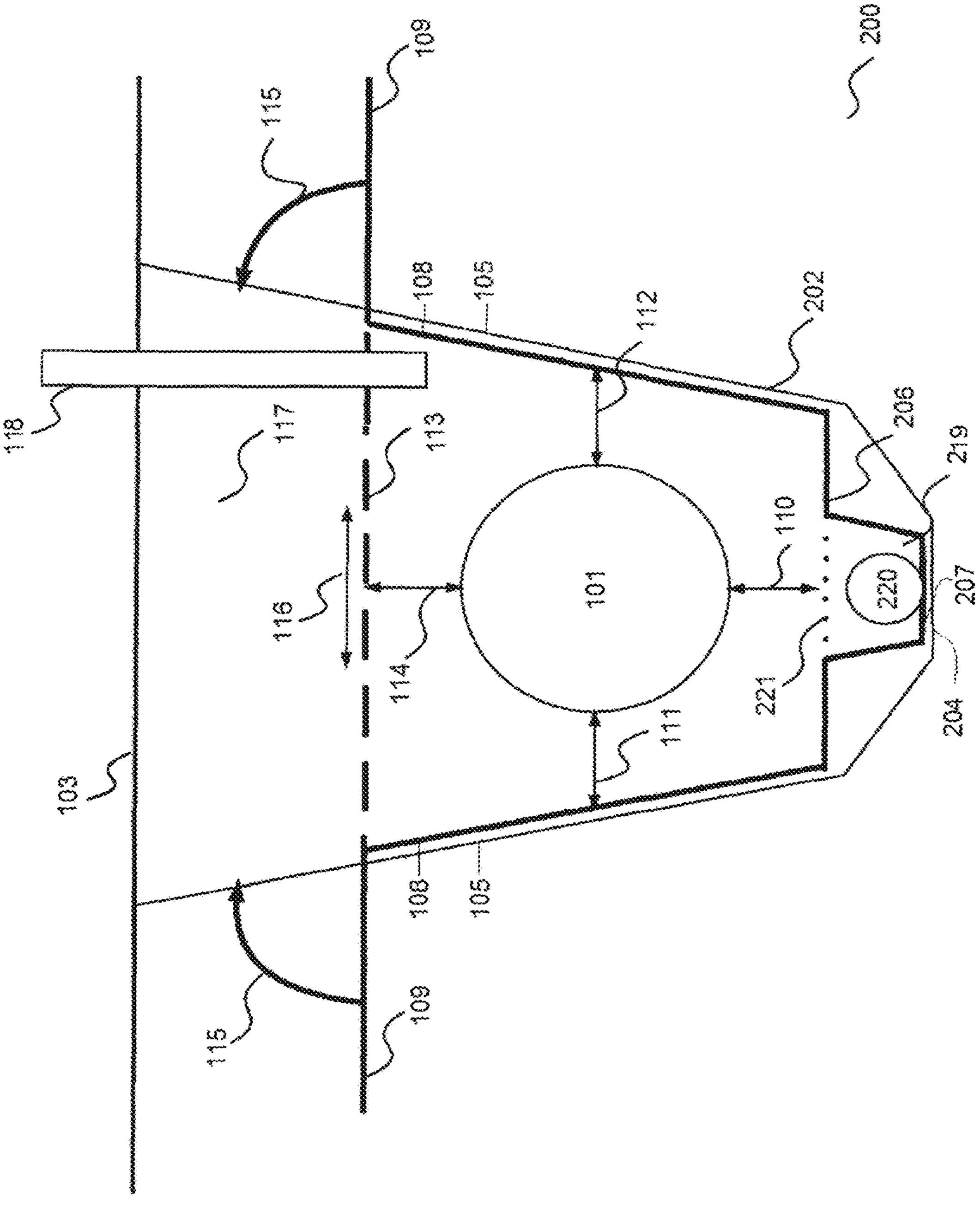
FIG. 3 is a cross-sectional view of one embodiment of a system for a lined pipeline trench with a containment channel.

In one embodiment shown in FIG. 3, the system for secondary containment for pipeline transport (200) comprises a containment channel (219). When viewed in cross-section, the trench (202) is in the form of a partially pentagonal-shaped containment to accommodate the containment channel (219). However, the particular size and shape of the trench (202) are not limitations of the invention. As previously described, the liner (206) may be either prefabricated or formed directly within the trench (202) to conform to the configuration of the trench (202) and to define the containment channel (219).

The containment channel (219) extends along the length of the trench (202). In one embodiment, the containment channel (219) has a width ranging from about 15 cm to about 120 cm. In one embodiment, the containment channel (219) has a width of about 30 cm. In one embodiment, the containment channel (219) has a depth ranging from about 20 cm to about 40 cm. In one embodiment, the containment channel (219) has a depth of about 30 cm.

In one embodiment, the containment channel (219) accommodates a pipe (220) which extends along the length of the containment channel (219). The pipe (220) may be corrugated pipe or slotted pipe for receiving or admitting fluid therein. In one embodiment, a screen (221) is disposed between the pipeline (101) and the pipe (220) and comprises sufficiently sized apertures. The size of the apertures is selected depending on the fluid conveyed through the pipeline (101).

During breach of the pipeline (101), any fluid from the pipeline (101) is fed by gravity through the screen (221) and into the pipe (220) within the containment channel (219). The contained fluid is then conveyed within the pipe (220) to one or more reservoirs (322, 323). This embodiment may be useful in a situation for example, where a pipeline (101) breaks and causes a substantial flood of fluid. The fluid remains contained within the liner (206) and prevented from migrating behind the liner (206) and leaking onto the trench (202) and into the natural environment since the fluid is effectively contained within the pipe (220) of the containment channel (219). The build-up of fluid and pressure within the "envelope" defined by the liner (206) forces the fluid to move laterally. Without being bound by any theory, moving laterally is easier than penetrating the integrity of the liner (206). The fluid follows a path of least resistance to relieve the pressure associated with a leak, travelling easily along the containment channel (219) as assisted by the liner (206).

Figure 4:
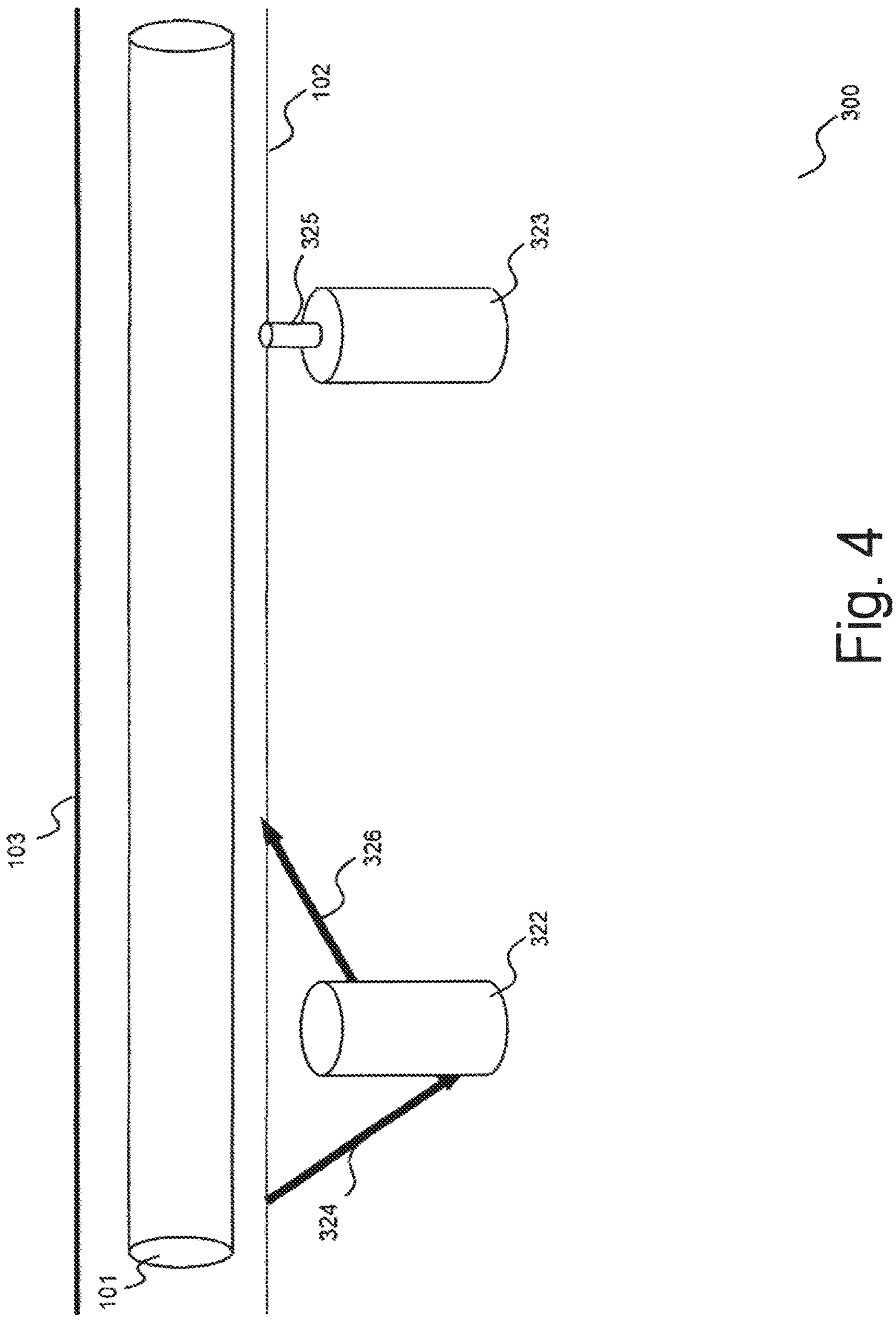
FIG. 4 is a side view of one embodiment of a system for a lined pipeline trench with reservoirs.

In one embodiment shown in FIG. 4, the system for secondary containment for pipeline transport (300) comprises one or more reservoirs (322, 323) spaced apart along the length of the lined trench (102) or the containment channel (219) to contain any fluid flowing along the lined trench (102) or containment channel (219). In one embodiment, reservoirs (322, 323) are positioned about every 500 meters along the lined trench (102) or containment channel (219).

A capture tube (324, 325) connects the trench (102) to the reservoir (322, 323) to allow the passage of the fluid from the trench (109) into the reservoir (322, 323). In one embodiment, the reservoir (322, 323) comprises a cistern having sufficient volume in which to recapture and store the fluid. In one embodiment, the reservoir (322, 323) has a height greater than about three meters. In one embodiment, the reservoir (322, 323) has a diameter of about one meter.

In the event that the volume of fluid is of sufficient magnitude to overwhelm the first reservoir (322), an overflow drain (326) is configured to allow the fluid to continue to flow to the second reservoir (323) positioned further downstream at a predetermined distance. In one embodiment, the reservoir (323) is configured to have at least one capture tube (325) which also acts as an overflow drain as the fluid continues to flow along the lined trench (102) to the next reservoir as no more fluid will fit into the instant reservoir (323).

It will be appreciated by those skilled in the art that the average response time for a leak may be used to calculate a required volume for the reservoir (322, 323), the number of required reservoirs (322, 323), and the distance between each adjacent reservoir (322, 323). During a leak, the main pipeline system shuts off flow, and all fluid inside the lined trench (102) or in the containment channel (219) is collected in a plurality of reservoirs (322, 323) to be available for recycling or reintroduction into the system (100, 200). Such a system of recapture protects the natural environment including wildlife, the water table, and other impacts that a leak may introduce for elements near the pipeline (101). Further, recapture salvages fluid that might have otherwise been wasted or lost to the environment.

Figure 5:
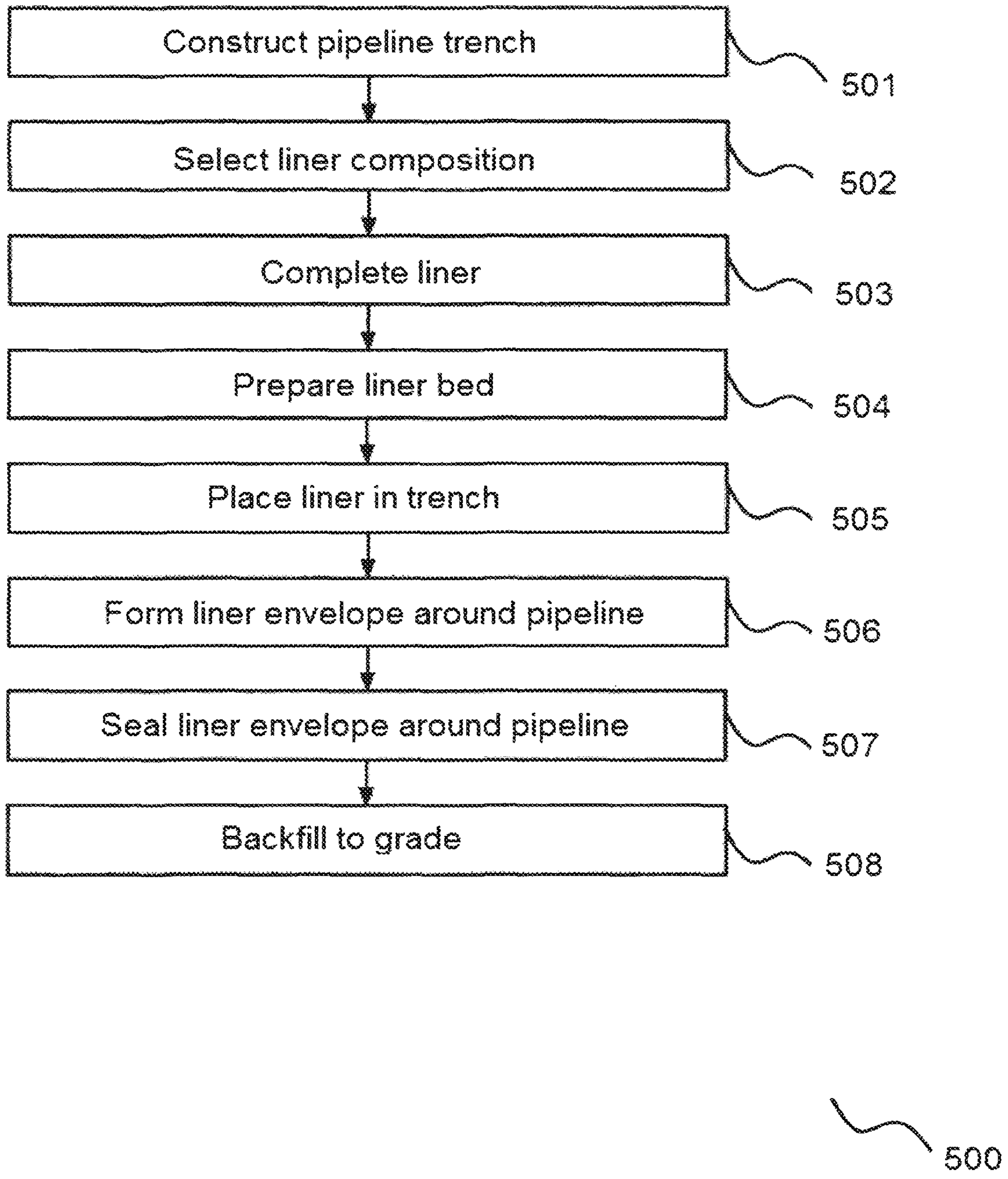
FIG. 5 is a flow diagram showing one embodiment of a method for deploying a secondary containment system for a lined pipeline trench.

In one embodiment, the present invention comprises a method for deploying a secondary containment system for a lined pipeline trench. Exemplary steps of the invention are presented schematically in FIG. 5. The first step (501) involves construction of the pipeline trench. Once the trench (102) has been constructed, the trench (102) is inspected to ensure provision of the desired side distances (111, 112) of space on either side of the pipeline (101) and the top distance (114) above the pipeline (101) for backfill topsoil, aggregate, or engineered material (117).

In the second step (502), the substrate (127) for the liner (106) is selected depending upon various factors including, but not limited to, the application, pressure of the fluid within the pipeline (101), and the desired distances (110, 111, 112, 114). The substrate (127) is placed into the trench (102) to conform to the configuration of the trench (102), with a predetermined amount of the substrate (127) being included to allow for the segments (109) to define the overlap (116) for enveloping the pipeline (101) within the trench (102).

In the third step (503), the substrate (127) for the liner (106) is coated on one or both sides with a polymer (128) selected from for example, polyurethane or polyurea. In one embodiment, the liner (106) is coated on both sides. The polymer (128) is applied at a predetermined thickness to both sides of the substrate (127) to yield the liner (106). In one embodiment, the polymer (128) is not applied to the segments (109) of liner (106) until the overlap section (116) has been formed (as discussed below), at which time the segments (109) are spray-welded with the polymer (128) to complete an envelope around the pipeline (101). The polymer (128) can be applied to the liner (106) in either a workshop or on-site after the substrate (127) has been placed into the trench (102). For on-site application, the negative side of the substrate (127) is coated by folding it across the trench (102) and repeating the process on the positive side, ensuring that both sides are lifted high enough to coat both sides in the polymer (128) evenly and completely. The coating is left to cure. In one embodiment, the polymer (128) is fully cured after about 7 days. In one embodiment, the polymer is sufficiently cured for underground use after about 7 minutes and finishes curing below ground after being buried.

In the fourth step (504), backfilled topsoil, aggregate, or other engineered material (117) is placed on top of the liner (106) to hold it in position within the trench (102).

In the fifth step (505), the pipeline (101) is placed on top of the liner (106), and sufficient backfilled topsoil, aggregate, or engineered material (117) refills the desired distance (114) above the pipeline (101). In one embodiment, the backfilled topsoil, aggregate, or engineered material (117) is dry to retard any future corrosion to the pipeline (101).

In the sixth step (506), the segments (109) of the liner (106) are overlapped or folded overusing the overlap motion (indicated by arrow 115) to form the cover (113) and an overlap section (116) to envelope the pipeline (101). In one embodiment, the segments (109) are not coated with polymer (128), as previously discussed.

In the seventh step (507), a spray is applied to each individual segment (109) forming the overlap section (116) to envelope or seal the pipeline (101). In one embodiment, the spray is applied along the seam of the overlap section (116) after the overlap section (116) has been formed. In one embodiment, the spray is selected from polyurethane or polyurea.

In the eighth step (508), backfilled topsoil, aggregate, or engineered material (117) is placed on top of the cover (113) and refilled up to ground surface (103) to bury the secondary containment system (100).

Figure 6A:
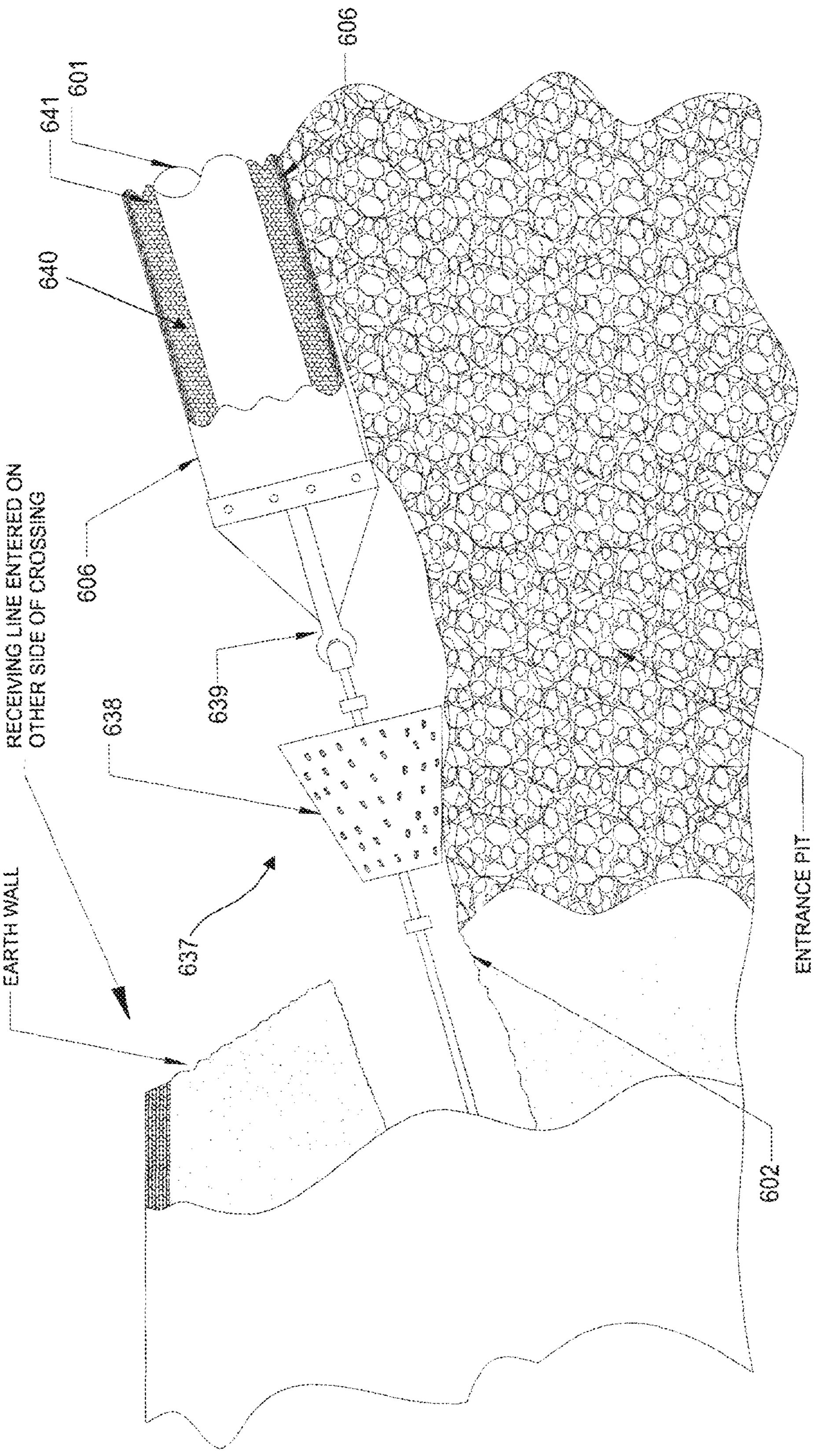
FIG. 6A is a schematic diagram showing one embodiment of a method for deploying a secondary containment system for a lined pipeline trench.
Figure 6B:
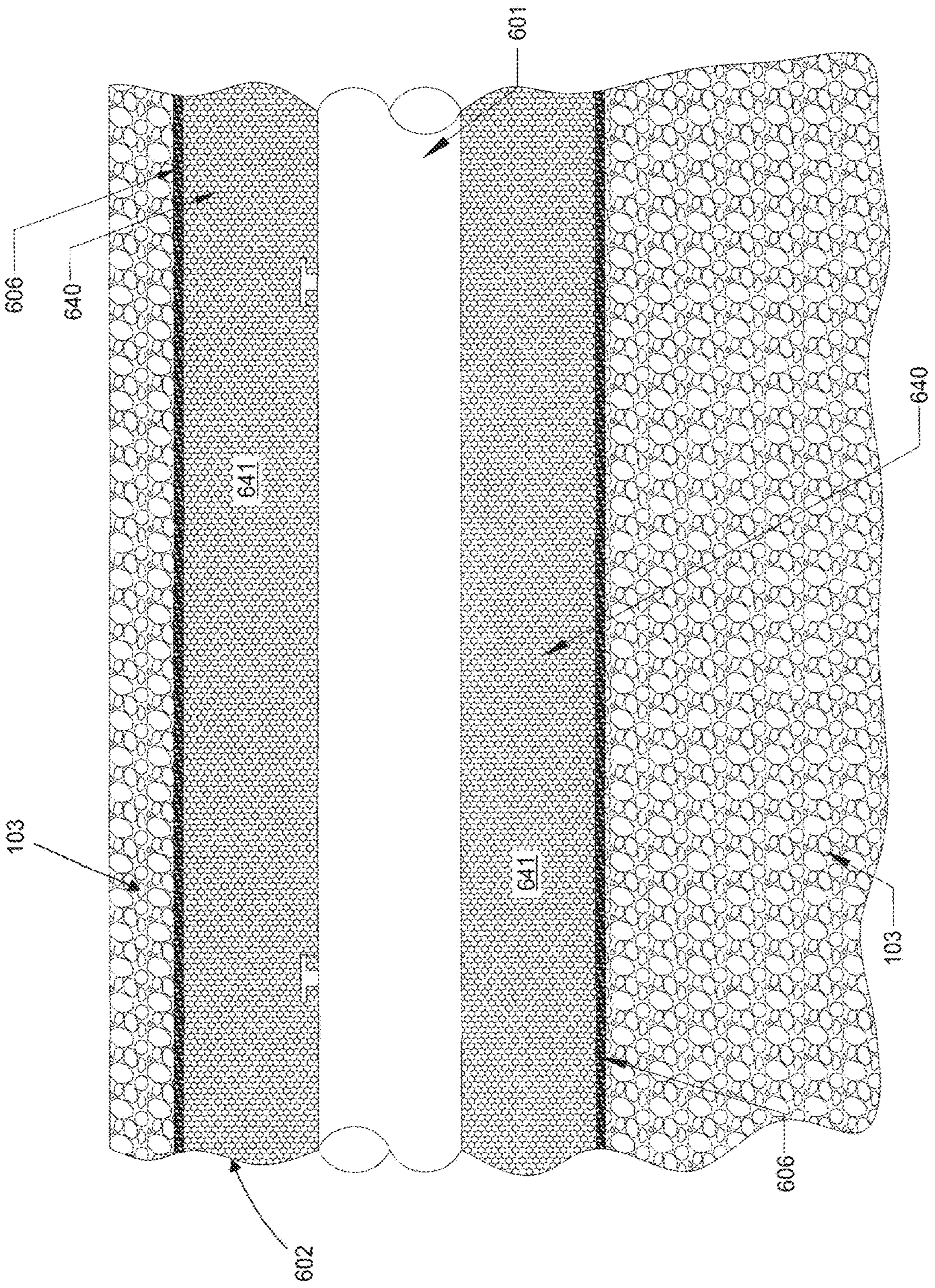
FIG. 6B is a schematic diagram showing one embodiment of a method for deploying a secondary containment system for a lined pipeline trench.

In one embodiment shown in FIGS. 6A-6B, the method of deploying a secondary containment system comprises disposing a tubular liner (606) within an underground enclosed tunnel-like trench (602). This may be particularly useful when the pipeline (601) needs to extend under, for example, a body of water, a road, a farm, or other obstacle that makes it impractical for an open ditch trench to be formed in the ground. The tubular liner (606) comprises a flexible substrate coated with polymer rendering it impermeable, as previously described. However, the tubular liner (606) can be prefabricated in a tubular shape before being disposed within the tunnel-like trench (602).

As shown in FIG. 6A, the tubular liner (606) is installed underground within the tunnel-like trench (602) by being pulled through the tunnel-like trench (602) as indicated by the arrow. During installation, the tubular liner (606) is laid directly in front of a first end of the tunnel-like trench (602). In one embodiment, the pipeline (601) is similarly laid directly in front of the first end of the tunnel-like trench (602). The tubular liner (606) is attached to a pulling means (637). In one embodiment, the pulling means (637) comprises a reamer (638) attached to the tubular liner (606) by a coupling (639). Once attached to the pulling means (637), the tubular liner (106) is pulled through the tunnel-like trench (602) from the first end towards a desired second end. As the tubular liner (606) is pulled through the tunnel-like trench (602) between the first and second ends, the tubular liner (606) unfolds in an “accordion-like” manner to extend fully along the length of the tunnel-like trench (602). The pipeline (601) is pulled simultaneously through the tunnel-like trench (602) by attaching the pipeline (101) to the pulling means (637). Alternatively, the pipeline (601) can be already in place within the tunnel-like trench (602) when the liner (606) is positioned. When the pipeline (601) and liner (606) are in place, a fill material (640) is pumped into voids (641) between the liner (606) and the pipe (601). In one embodiment, the fill material (641) comprises an absorbent material. In one embodiment, the absorbent material is selected from an engineered material, an oil-absorbing polymer, or a combination thereof.

As shown in FIG. 6B, once the tubular liner (606) is in place within the tunnel-like trench (602) and the fill material (641) has been introduced into the voids (641), the pipeline (601) is attached to adjacent pipeline sections to enable fluid transport. Reservoirs (not shown) are installed to receive any leaked fluid that flows to either side of the tunnel-like trench (602). In one embodiment, pumps (not shown) are used to pump leaked fluid from inside the tubular liner (606).

In the event that a leak has occurred, the damaged section of the pipeline (101) and the contaminated portion of the liner (106) may be easily and rapidly removed and replaced. The cover (113) is cut open, and the contaminated topsoil is removed from beneath the cover (113) to expose the damaged section of the pipeline (101). The damaged section of the pipeline (101) is removed. The contaminated portion of the liner (106) is cut out, and a piece of new substrate (127) is adhered to cover the cut-out and to overlap the existing liner (106). In one embodiment, the overlap is about 12 inches. The new substrate piece (127) is rendered impermeable and adhered to the existing liner (106) by spray-welding both sides of the new substrate piece (127) with a suitable polymer (128) (for example, polyurethane or polyurea). Any tears or rips caused by for example, construction equipment, can be repaired in the same manner. Repair guns loaded with polymer cartridges can be made readily available for use on-site.

In several embodiments shown in FIGS. 7A-7D, the separating means such as aggregate, soil, or native soil backfill for a containment system (700) may be replaced with a diffusing material (702).

Figure 7A:
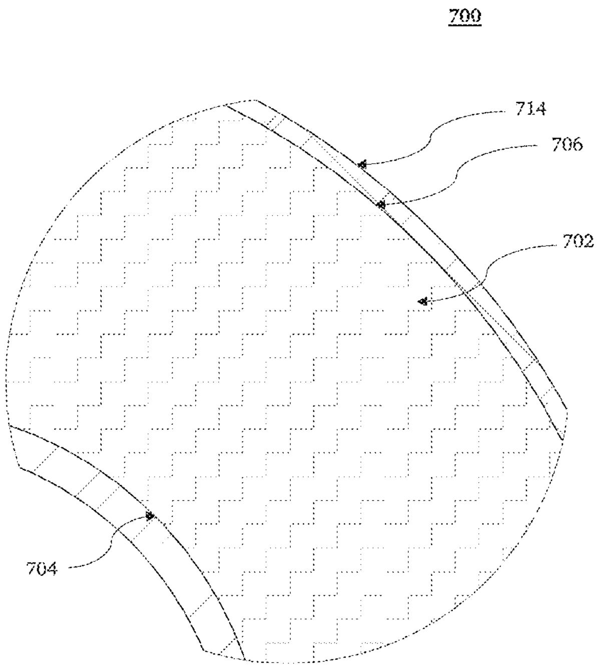
FIG. 7A is a schematic diagram showing one embodiment of a containment system comprising a diffusing material.

In one embodiment, as shown in FIG. 7A, the diffusing material (702) may have a small diameter. Further, the diffusing material (702) may have a mesh structure consisting of woven or non-woven strands, having a small diameter, e.g., ranging from approximately 0.025"-0.050" in value and made out of flexible recycled plastic, Polyvinyl chloride (PVC), new or recycled high density polyethylene or other suitable material with attributes that allow diffusing material (702) to resist pressure from a jet of liquid such as that from a leak within pipeline (704). According to the embodiment, composition of the diffusing material (702) may be such that the strands may have been compacted, pressed, glued, or fused (or some other form of adhesion) together to form the mesh that may be manufactured to resemble a "matting structure" that may be wrapped around a pipe in a plurality of layers during production of the pipeline (704).

The matting structure, in an embodiment, may have attributes that may be able to withstand a jet of liquid or gas, such as from a jet of liquid from a pipeline leak without being cut or torn to allow free unimpeded access to the outside containment liner wall (714). The diffusing material (702) may be porous, non-woven, or woven material that may allow for the flowing of a gas or liquid through an air space within the porous material such as during a leak in the pipeline (704). The diffusing material (702) may have sufficient porosity to allow the flow of a liquid or gas through the porous material, but enough strength to reduce pressure from a liquid or gaseous jet, such as when a leak forms in the pipeline (704). Such a porous nature of diffusing material (702) may advantageously ensure that when leaked liquid or gas contacts with the outside containment liner (706), the impact on the containment liner (706) is insufficient to penetrate the containment liner (706), thus avoiding spillage.

In an embodiment, the containment liner (706) may be wrapped or sprayed in place, such as from a polyurea or polyurethane material for example, directly on top of the diffusing material (702) and is in contact with the diffusing material (702). In some embodiments, the diffusing material (702) may be substantially tightly wrapped around the pipeline (704) to encompass the pipeline (704) fully or encompass a section of pipeline (704). In one embodiment, diffusing material (702) may be held to the pipeline (704) using tape or another suitable product that can be wrapped around diffusing material (702) to hold it in place. The tape may be used to hold the diffusing material (702) in place until the containment liner (706) is installed and sealed.

In an embodiment, the pipeline (704) internal operating pressure may determine a required thickness of diffusing material (702), usually in a range of 1"-6" with the most common application being 1.5." Further, the thickness may be achieved through multiple layers of the diffusing material (702), wherein each layer may be ¼" to 3" in thickness.

In the embodiment, when a leak from the pipeline (704) occurs, the leaking gas/liquid may pass through the layers of the diffusing material (702), in a manner that a "jet" from the leak comes into contact with the diffusing material (702) first. However, the pressure of the leak is reduced, as it is "split" or broken up by the diffusing material (702). That is, as the leak passes through the layers of the diffusing material (702), enough reduction in pressure may be realized, such that the leak cannot penetrate the outer containment wall that encompasses both the pipeline (704) and diffusing material (702). In one preferred embodiment, the diffusing material (702) may reduce the pressure in the leak enough so that the leak may not penetrate the outer containment wall that encompasses both the pipeline (704) and the diffusing material (702). Further, as the leak happens, the leaking gas/liquid may contact a leak detection system (shown in detail with respect to FIGS. 7B and 7D), held within the layers of the diffusing material (702) between the pipeline (704) and the outside containment liner (706).

In another embodiment, each layer may be taped individually and wrapped tightly around the pipeline (704). Such a wrapping technique may be performed above ground level next to the pipeline (704) trench, before the pipeline (704) is placed in the trench, while the pipeline (704) is in the pipeline (704) trench, or in a shop before the pipeline (704) is sent to a project site.

Figure 7B:
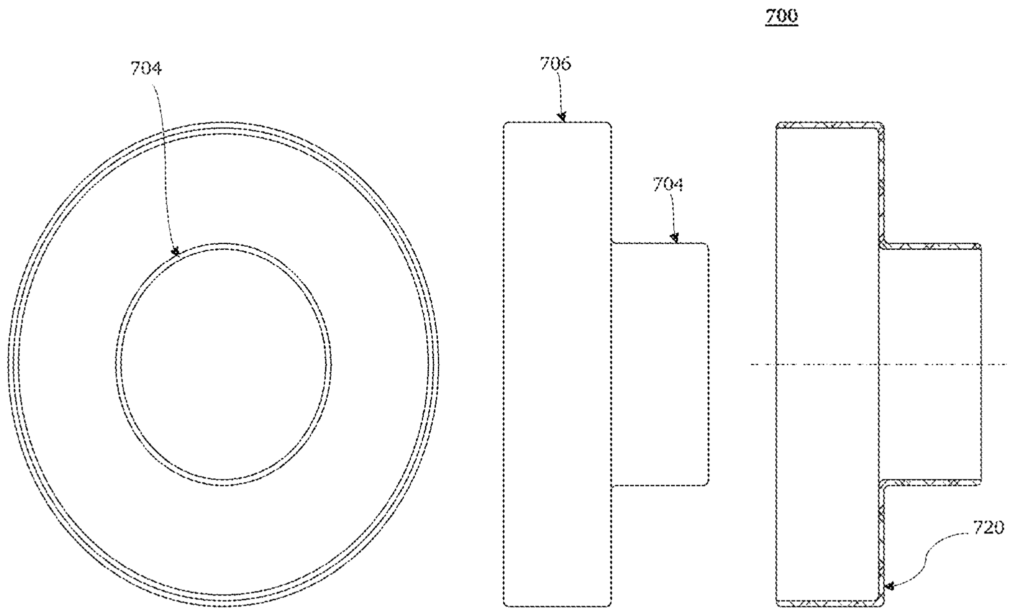
FIG. 7B is a schematic diagram of an embodiment of an end cap arrangement for sealing an end of a containment liner encompassing a pipeline.

FIG. 7B illustrates a cross sectional view and a side view of the containment system (700), in accordance with a preferred embodiment of the present invention. According to the embodiment, the containment system (700) may comprise of a pipeline (704) encompassed by the diffusing material (702) and containment liner (706), in a concentric arrangement. Further, the containment system (700) may comprise of an end cap (720) arrangement for sealing an end of the containment liner (706) that encompasses the pipeline (704), in a preferred embodiment of the present disclosure. In the embodiment, the end cap (720) may be created using a mold such as to match the dimensions of end cap to that of the pipeline containment area (716). The end cap (720) may fully encompass the main body of the containment area (716) installed on the pipeline (704) as well as the pipeline (704) as a whole. Further, the end cap (720) may be detachably attached to the pipe either by clamping the end cap to the pipeline (704) or by spraying the end cap (720) on the pipeline (704) using an adhesive. In a preferred embodiment, the use of end cap may provide for a completely sealed termination point arranged in a manner so as to inhibit the escape of a liquid or a gas leaking from the pipeline (704) onto the surrounding surface. The end cap (720) may also inhibit the ingress of water or other material into the pipeline (704) from the surrounding environment.

Figure 7C:
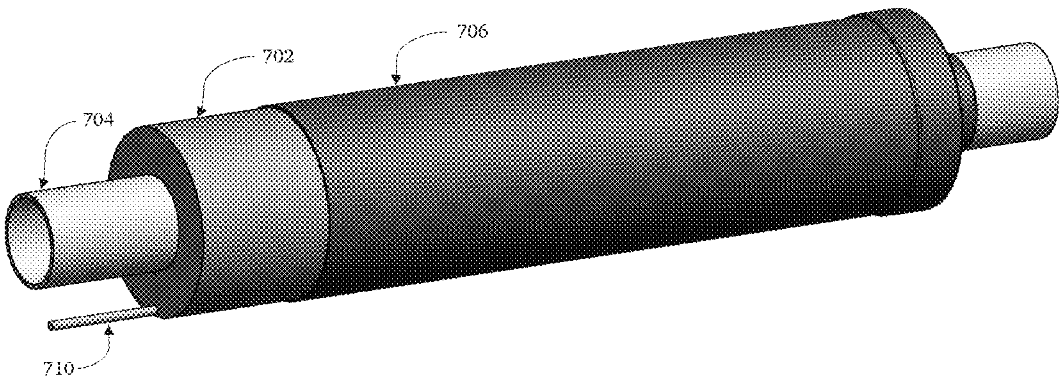
FIG. 7C is an exemplary arrangement of another embodiment of a containment liner and a diffusing material.

FIG. 7C illustrates an exemplary arrangement of a containment liner (such as containment liner (706)) and the diffusing material (702), according to a preferred embodiment of the present disclosure. In the preferred embodiment, the diffusing material (702) is arranged in place around and in contact with an outer surface of the pipeline (704), and the containment liner (706) may then be installed on top of the diffusing material (702) to fully encompass the area that the diffusing material (702) has been installed upon. In some embodiments, the containment liner (706) may consist of a spray applied polyurea, polyurethane, thermoplastics, High Density Poly Ethylene (HDPE), Linear low-density polyethylene (LLDPE), polyethylene, carbon fiber or other suitable material that may be able to withstand the environment the containment system (700) operates within, including subsea pipelines. The containment liner (706) may be placed on top of and around, entirely, the diffusing material (702) layers to form a containment system capable of containing leaks in pipeline (704).

In an embodiment, the containment liner (706) may be wrapped around the diffusing material (702) and may hold the gas/liquid leaking within the air space within the diffusing material (702). Such an arrangement may favorably stop leaks from escaping the area of the pipeline (704) by making use of an impenetrable barrier. Further, to avoid pressure building up inside the containment area (706), one or more external holding tanks may be positioned strategically along the length of a pipeline (704) to provide a space for the excess flow of the leaking gas or liquid moving through the containment system (700) during a leak. The holding tanks may allow the air moving ahead of the leak to be evacuated from within the containment system. The holding tanks may be constructed of optimum dimensions to as to provide storage for the leaking liquid or gas. Further, the size of the holding tanks may be dependent on the size of the pipeline (704) and the product flowing through it.

In another embodiment, avoid pressure building up inside the pipeline area (712) and thereby in the containment area (716), a pressure relief valve (not shown) may be installed in the containment area (716) allowing air to be vented to the surface but not towards the direction of the leak. Further, a vent stack may allow for the venting of any air pressure that might build inside the containment area (716). The vent stack, in an embodiment, may comprise of a backflow preventer or check valve check wafer valve or any other devices that may allow for the venting of any air pressure.

Figure 7D:
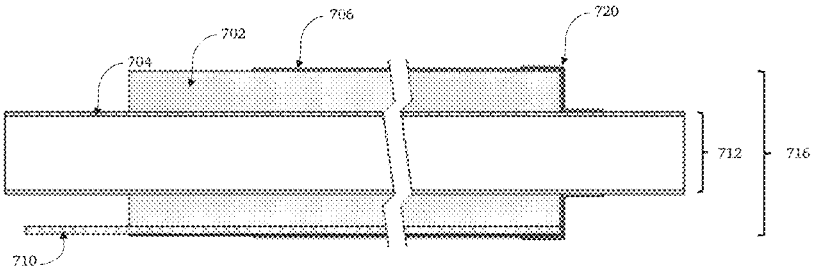
FIG. 7D illustrates an exemplary arrangement of an embodiment of a leak detection system.

FIG. 7D illustrates an exemplary arrangement of a leak detection system installed within the containment system (700), according to a preferred embodiment of the present disclosure. In the embodiment, during a wrapping procedure of the diffusing material (702), a leak detection cable (710) or sensor may be installed within the diffusing material (702). The leak detection cable (710) may be placed between the containment liner (706), having end cap (720), and the pipeline (704) of the pipeline (704). Further, a channel or slit may be cut into the diffusing material (702) or the leak detection cable (710), and the leak detection cable (710) may then be installed between diffusing material (702) and the containment liner (706).

In a preferred embodiment, leak detection cable (710) may be powered via batteries or renewable sources that run from the surface or beneath the surface, to the leak detection cable (710). Further, one or more options for leak detection system may comprise acoustic sensors, temperature sensors, vibration sensors, absorption sensors, pipe strain sensors, contact sensors, or a combination of the aforementioned that may be suitable for use inside the containment area (716).

Figure 7E:
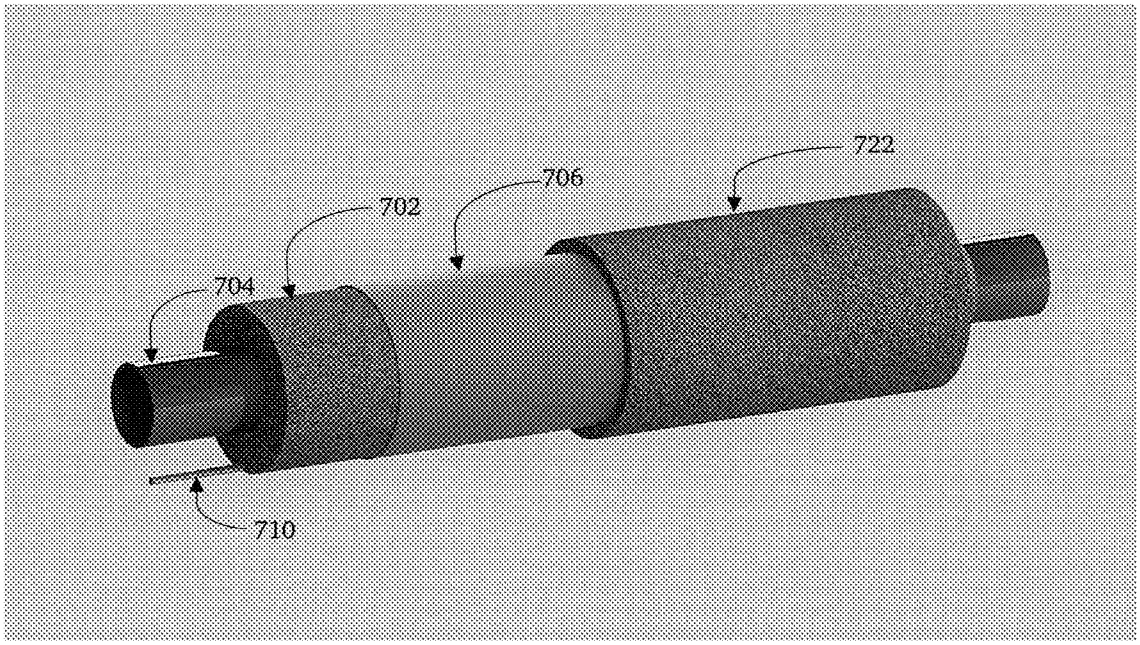
FIG. 7E is a schematic diagram showing an embodiment of a containment system comprising a protective sheath.

In one embodiment, as shown in FIG. 7E, the containment system (700) may further include a protective sheath (722) over the containment liner (706). In the embodiment shown, the containment liner (706) may be wrapped with the protective sheath (722) to protect the containment liner (706) from damage from rocks or other sharp materials in the trench and/or during a backfill process within the trench. In one embodiment, the protective sheath (722) may be substantially similar to configuration and material to the diffusing material (702). In other embodiments, the protective sheath maybe formed using materials such as ceramics, polymers, metals, and the like.

In some embodiments, the protective sheath (722), may comprise of any suitable product able to protect the containment liner (706) from tears or impingement from rocks or sharp objects, and may be used on the outside of the containment liner (706). The protective sheath (722) may also facilitate for protection of the containment system (700) from impingement potential in highly rocky trenches or environments where it might be difficult to mitigate terrain of the soil or backfill to be placed on top and around the containment area (716).

It should be apparent, however, to those skilled in the art that many more modifications besides those already described are possible without departing from the inventive concepts herein. The inventive subject matter, therefore, is not to be restricted except in the scope of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A containment system for containing matter leaked from a pipeline, the containment system comprising:

a flexible, containment liner to receive and hold matter moving under pressure leaked from the pipeline, the containment liner disposed to extend along the pipeline for enveloping the pipeline deployed therein; and layers of flexible porous diffusing material wrapped around the pipeline, wherein the layers of diffusing material are disposed between the pipeline and the containment liner and operable to allow the flow of a liquid or gas through the porous material;

wherein the diffusing material comprises a compressible, porous structure formed from woven or non-woven strands, the porous structure having interconnected spaces between the strands to allow for the diffusion and distribution of leaked matter, wherein the layers of the diffusing material form a pre-defined thickness of diffusing material around the pipeline, the pre-defined thickness defined in accordance with an internal operating pressure of the pipeline, the diffusing material is operable to absorb and diffuse pressure from a jet of liquid leaking from the pipeline;

wherein the containment liner is wrapped on top of and in direct contact with an outermost layer of the layers of the diffusing material and receives the matter leaked from the pipeline via the layers of the diffusing material, wherein the layers of diffusing material are operable to diffuse the high-pressure jet of liquid leaked from the pipeline to the containment liner, and wherein the diffused pressure of the matter leaking to the containment liner prevents migration of the matter leaked from the pipeline outside of the containment liner into an environment external to the containment system.

2. The system of claim 1, wherein the containment liner comprises a coated substrate, the coated substrate is selected from the group consisting of woven geotextile fabric, para-aramid synthetic fiber, carbon fiber, fiberglass, rubber, thermoplastic, polyvinyl chloride, polyethylene, epoxy, and another polymer.

3. The system of claim 2, wherein the substrate is coated with a polymer selected from the group consisting of polyurethane, polyurea, or a combination thereof, a premade liner, a high-density polyethylene, and a linear low-density polyethylene, wherein the linear low-density polyethylene of sufficient thickness and tensile strength withstands environment factors, pressures, and temperatures present in the pipeline and in the environment external to the pipeline.

4. The system of claim 1, wherein the containment liner further comprises an insulation layer.

5. The system of claim 1, wherein the matter comprises one of a gas and a liquid.

6. The system of claim 1, further comprising a vent extending upwardly from within the containment liner to an area above the pipeline and the containment liner, the vent being anchored and sealed within the containment liner by a flanged boot or by means of a saddle that is attached to the pipeline and housed within the containment system, to allow for safe removal of a pipeline product that is contained in an annulus between the containment liner and pipeline.

7. The system of claim 1, wherein the containment liner is in the form of a tubular liner.

8. The system of claim 1, further comprising a protective sheath disposed over the containment liner.

9. The system of claim 1, wherein the matter is one of petroleum and a petroleum product.

10. The system of claim 1, wherein the diffusing material is constructed in a mesh structure using one or more woven materials or one or more non-woven materials.

11. The system of claim 1, wherein the diffusing material is constructed using flexible recycled plastic, Polyvinyl chloride, high density polyethylene, or a combination thereof.

12. The system of claim 1, wherein the diffusing material is manufactured by one or more of compacting, pressing, gluing, and fusing together of flexible recycled plastic, Polyvinyl chloride, high density polyethylene, or a combination thereof.

13. The system of claim 1, further comprising a leak detection system installed therein, the leak detection system at least comprising a leak detection cable comprised within the diffusing material.

14. The system of claim 13, wherein the leak detection cable is placed between the containment liner and the pipeline, and wherein the leak detection cable is installed between diffusing material and the containment liner.

15. The system of claim 1, wherein the containment layer is in contact with diffusing material and wrapped directly on top of the diffusing material.

16. The system of claim 1, wherein the pipeline, the containment layer and the diffusing material are placed in a concentric arrangement in the containment system.

* * * * *